(12) United States Patent
Schmitz et al.

(10) Patent No.: US 8,593,288 B2
(45) Date of Patent: Nov. 26, 2013

(54) METHOD AND DEVICE FOR DRIVER STATE DETECTION

(75) Inventors: Carsten Schmitz, Bendorf (DE); Tobias Altmueller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1043 days.

(21) Appl. No.: 12/085,858

(22) PCT Filed: Nov. 13, 2006

(86) PCT No.: PCT/EP2006/068401
§ 371 (c)(1),
(2), (4) Date: Nov. 2, 2009

(87) PCT Pub. No.: WO2007/147444
PCT Pub. Date: Dec. 27, 2007

(65) Prior Publication Data
US 2010/0039249 A1  Feb. 18, 2010

(30) Foreign Application Priority Data

Dec. 1, 2005  (DE) .................. 10 2005 057 267

(51) Int. Cl.
*G08B 23/00*  (2006.01)

(52) U.S. Cl.
USPC ............ 340/576; 340/575; 340/438; 340/439

(58) Field of Classification Search
USPC ......... 340/435, 436, 438, 439, 575, 576, 901, 340/903; 701/33, 48, 300, 301; 180/271, 180/272
See application file for complete search history.

(56) References Cited

U.S. PATENT DOCUMENTS

| 4,509,040 | A | | 4/1985 | Seko et al. | |
|---|---|---|---|---|---|
| 5,642,093 | A | * | 6/1997 | Kinoshita et al. | 340/439 |
| 6,161,071 | A | * | 12/2000 | Shuman et al. | 701/48 |
| 7,455,146 | B2 | * | 11/2008 | Brosig et al. | 180/272 |
| 7,821,421 | B2 | * | 10/2010 | Tamir et al. | 340/901 |
| 2004/0036613 | A1 | * | 2/2004 | Maass | 340/575 |
| 2008/0024284 | A1 | * | 1/2008 | Baratoff et al. | 340/435 |
| 2008/0258884 | A1 | * | 10/2008 | Schmitz | 340/425.5 |

FOREIGN PATENT DOCUMENTS

| DE | 196 02 766 | 8/1996 |
|---|---|---|
| DE | 197 20 626 | 12/1997 |
| DE | 100 00 473 | 10/2000 |
| DE | 102 10 130 | 9/2003 |
| DE | 102 38 324 | 4/2004 |

* cited by examiner

*Primary Examiner* — Hung T. Nguyen
(74) *Attorney, Agent, or Firm* — Kenyon & Kenyon LLP

(57) ABSTRACT

A method and a device for detecting the state of a driver are described. In the process, the curve of a signal which characterizes the state of the driver is evaluated, and a signal indicating the state of the driver is generated in response to a typical curve.

12 Claims, 4 Drawing Sheets

METHOD AND DEVICE FOR DRIVER STATE DETECTION

FIELD OF THE INVENTION

The present invention is directed to a method and a device for driver state detection.

BACKGROUND INFORMATION

German patent document DE 102 10 130 A1 discusses a method and a device for warning a driver, in which a degree of driver attention or driver inattention is taken into consideration. This degree of attention, i.e. the state of the driver, is derived from the steering angle, especially from the change in the steering angle, for instance, of the gradient and/or the frequency of the angle changes and/or the spacing of successive steering angle changes. In addition, further influence variables for detecting the driver state are described, such as the gas pedal position and its change.

German patent document DE 102 38 324 A1 discusses a procedure for driver state detection, in which steering angle data and data of a track detection are taken into consideration. A decreased driver attention is discussed, with the aid of the monitoring of the steering wheel angle compared to a specified limiting angle, by monitoring the rotary speed at which the driver turns the steering wheel, and the monitoring of the distance of the vehicle from the lane sidelines compared to a specified limiting value. Furthermore, the frequency and the duration of states of rest of the driver, in which he undertakes no steering intervention, is also taken into consideration.

SUMMARY OF THE INVENTION

A clear improvement in the driver state detection is achieved by not only undertaking the monitoring of specified limiting values of individual signals, but by the driver's state being determined based on the curve within one signal.

The use of this procedure for driver state detection is particularly advantageous when applied to the evaluation of the steering angle. By monitoring the curve of the steering wheel angular velocity, the driver state detection is further improved. This is true particularly if the steering wheel angular velocity has been detected, first near zero and having a subsequent steering correction and a steering speed greater than a specific limiting value. In these cases one may assume inattention of the driver.

The additional consideration of the frequency and quality of driving errors is particularly advantageous, especially lane boundary crossings and/or the general lane behavior of the driver.

It is of particular advantage that using the method set forth for detecting the state of the driver, not only states of inattention due to fatigue but also states of inattention because of the influence of alcohol or drugs are able to be detected.

The use of the driver state information is advantageous in a plurality of driver assistance systems.

Further advantages result from the following description of exemplary embodiments.

The exemplary embodiments and/or exemplary methods of the present invention are described in greater detail in the following text with reference to the exemplary embodiments shown in the drawings.

DETAILED DESCRIPTION

Figure 1:
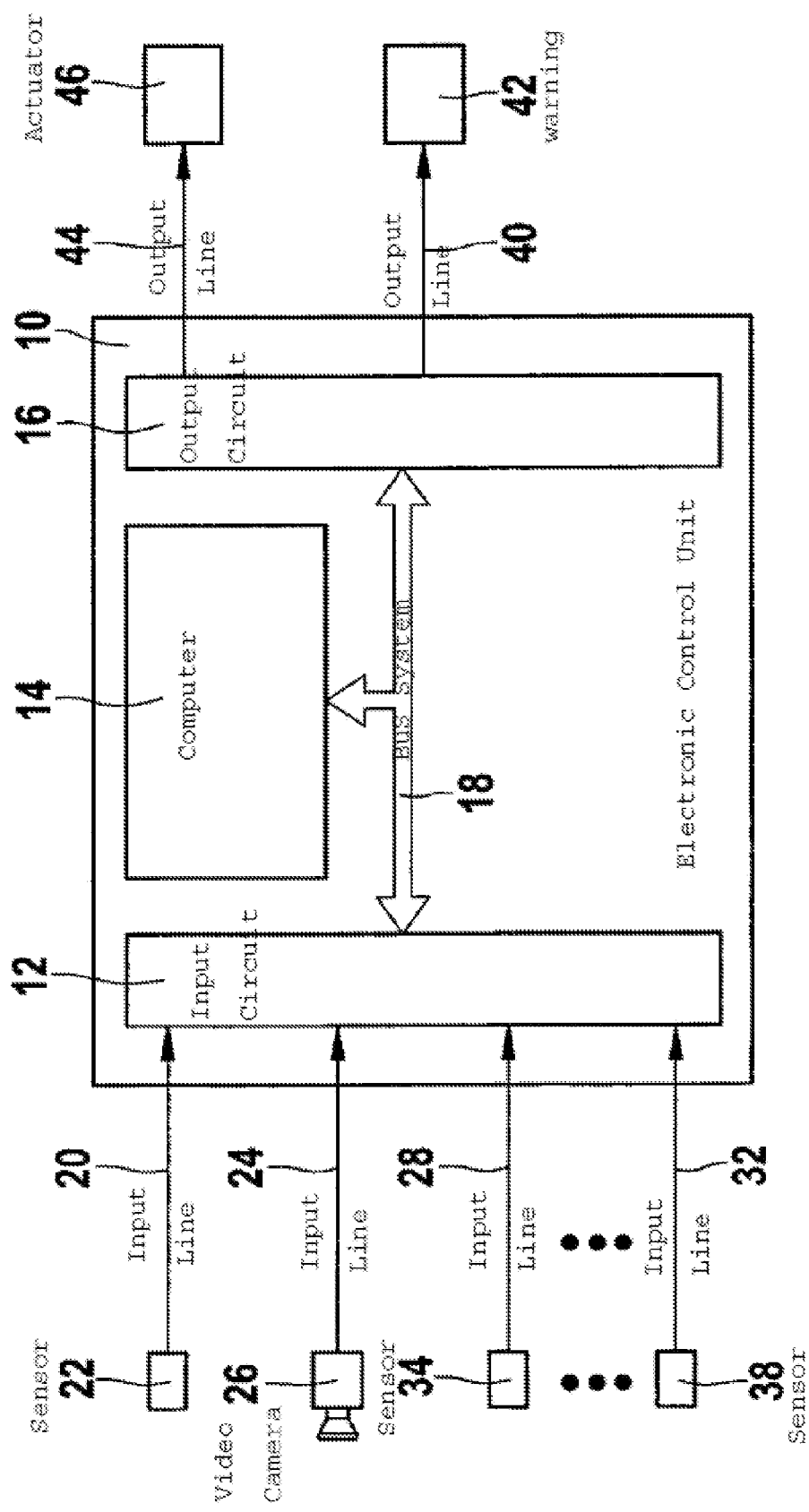
FIG. 1 shows a device for driver state detection.

FIG. 1 shows a device for driver state detection. The essential components in this instance are an electronic control unit 10, which is made up of essentially components such as an input circuit 12, a computer 14 and an output circuit 16. These components are connected to a bus system 18 for the mutual exchange of information and data. Various sensors are connected to input circuit 12, which may be via a bus system. In connection with the procedure described below, only the sensors essential to it are described. A steering angle sensor 22 is connected to input circuit 12 via a supply line 20. A video camera 26, the basis for detecting roadway edge markings, is connected to input circuit 12 via an additional supply line 24. Furthermore, additional sensors 34 to 38, whose signals are essential in connection with the procedure described below, are connected via input lines 28 to 32. Data are output via output circuit 16, for example, via an output line 40, a warning lamp 42 or an information display 42.

In one embodiment, an actuator 46 is controlled to influence the steering angle of the vehicle, the acceleration and/or the deceleration of the vehicle, via an output line 44.

Driver assistance systems are a part of the device described in FIG. 1, and they work based on a lane detection, such as, for instance, a so-called lane departure warning. Such systems are known from, for instance, the related art mentioned in the introduction. In these systems, the course of the lane markings is detected from the image of the video camera, the position of one's own vehicle and the position of one's own vehicle to be expected are compared to these lane edge markings, and a warning to the driver and for an intervention in the steering is output if the vehicle leaves the track or threatens to leave it. An essential parameter which is ascertained in this connection is the lateral distance of the vehicle from the lane edge marking.

In connection with the procedure described below, for driver state detection, the measuring of the steering wheel angle is essential. In one simple specific embodiment, the measurement of the steering wheel angle is sufficient for the driver state detection. In another advantageous specific embodiment, data on the steering wheel angle and data on the track, particularly on the lateral distance from the lane markings, are combined. If systems having video cameras are already part of the vehicle equipment, no additional costs are created by this supplementation.

One essential point of the driver state detection described below is that, for the driver state detection, the curve of at least one of the above-named signals is checked, and in one typical behavior of this signal, one is able to conclude that there is inattention on the part of the driver or, for instance, momentary drowsiness. The course over time of the steering wheel angular velocity is recorded, for instance, and checked. If one first obtains a steering wheel angular velocity in the vicinity of zero, and then a subsequent steering correction and a steering speed greater than a certain limiting value, one may assume an inattention of the driver or tiredness of the driver. This behavior represents a typical driver's reaction in the case of inattention, who reacts to his faulty driving in a jumpy manner by grabbing the steering wheel relatively strongly and undertaking a steering correction. What is important in this case is that the driver shows no substantial reaction at the steering wheel prior to his sudden steering intervention.

One improvement of the driver state detection is achieved by not only checking for the occurrence of such a behavior pattern, but by also monitoring a measurement of the frequency and/or the interval in time of such a behavior pattern, and assuming an inattentive driver if such steering corrections occur more frequently than specified.

An additional improvement in driver state detection may be achieved by taking track information into consideration. A further characteristic of an inattentive driver is leaving the lane, or imminent leaving of the track. Such a situation may be taken up using evaluation of the lateral distance of the vehicle from the lane marking. A driver state detection is further improved in that the above-described steering correction is ascertained in response to the leaving, or threatened leaving of the track, in a broadening while taking into account its frequency, and is employed for the driver state detection. An inattentive driver is assumed if, upon leaving or threatened leaving of the track, a corresponding steering correction takes place, as pointed out above, possibly more frequently than a specified frequency.

In FIGS. 2 and 3, time diagrams are shown which show two typical situations, that are analyzed according to the procedure shown for the detection of an inattentive driver.

Figure 2A:
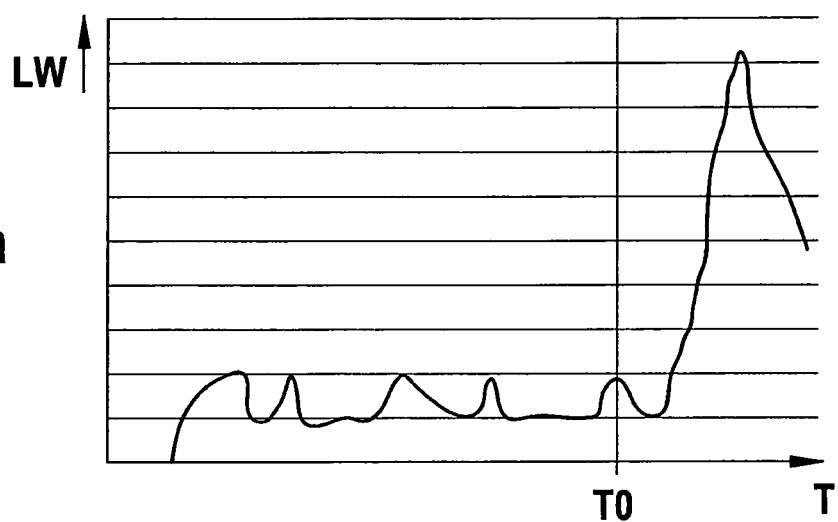
FIG. 2 shows a curves of a signal(s), which is shown with to aid in explaining the procedure for driver state detection.
Figure 2B:
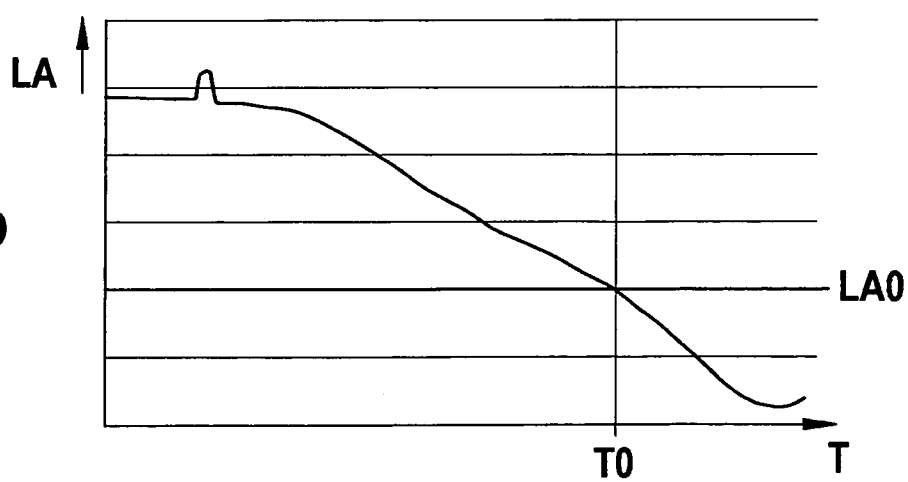

In this context, FIG. 2 shows a situation in a vehicle in which the inattention of the driver has been produced, for instance, by his operating other devices, such as, perhaps, a radio. FIG. 2a shows the curve over time of the steering angle, and FIG. 2b shows the curve over time of the lateral distance from a lane marking. It may be seen that, at first, slight steering angle corrections take place, and that the lateral distance according to FIG. 2b becomes ever smaller, that is, the vehicle moves continuously towards the lane edge marking. At point TO, the lateral distance falls below limiting value LAO, which indicates a lane departure or a threatening lane departure. This is registered by computer 14. In a directly temporal connection (a certain causal connection between lane departure and steering correction has to be present) with the lane departure, there then takes place, shortly after time TO, a steering angle correction, as was described above, which is shown in FIG. 2a.

In a first embodiment, the program of computer 14 accordingly values a driver as being inattentive if, at first, slight steering motions were ascertained until shortly after time TO, and a subsequent strong steering correction was ascertained. In one embodiment, in this instance, the frequency with which such a situation is detected is also taken into account, the driver being evaluated as inattentive only if the situation occurs more frequently than specified. In a further embodiment, the crossing or the threatened crossing of the lane marking is ascertained, as shown in FIG. 2b, and the steering angle correction in temporal connection with it is detected.

This is evaluated for valuing a driver as being inattentive, and a corresponding inattention signal is generated. This is used in various driver assistance systems for changing their parameters or is indicated to the driver optically and/or acoustically and/or haptically and/or olfactorily. For instance, the warning corridor of the lane departure warning is increased, that is, limiting values LAO, or an earlier warning in time is given In one adaptive vehicle speed controller having distance measurement, the distance to be maintained is increased, in order to give the driver more reaction time. Safety systems, that warn of a threatening collision, warn the driver earlier. The information output to the driver is substantially reduced.

Figure 3A:
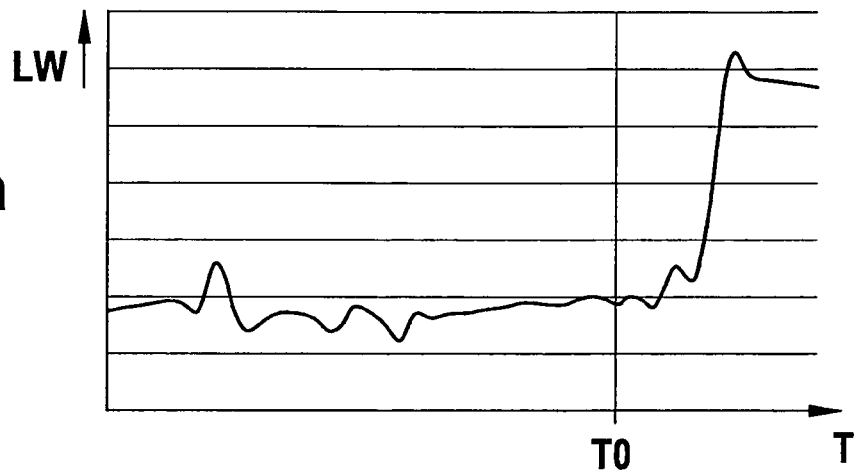
FIG. 3 shows a curves of a signal(s), which is shown with to aid in explaining the procedure for driver state detection.
Figure 3B:
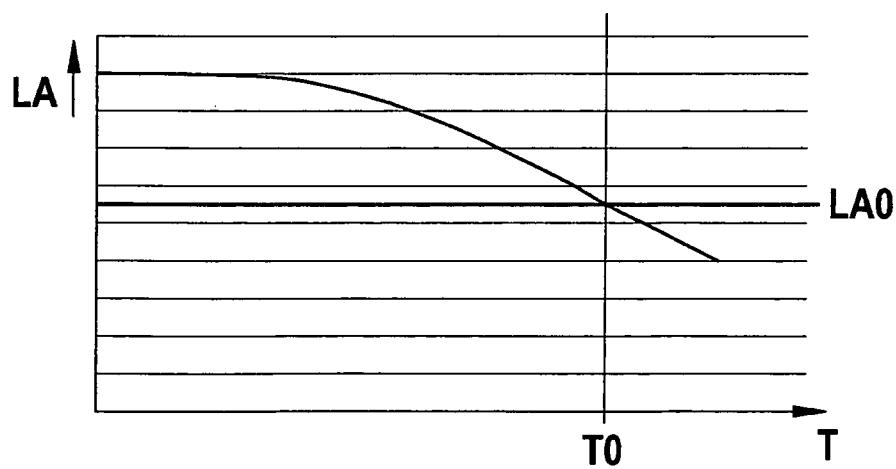

FIG. 3 shows a situation in response to a momentary drowsiness of the driver. Here too, there come about the typical behavior modes that were shown in FIG. 2. In FIG. 3, the time axis is also drawn horizontally, in FIG. 3a the steering angle is drawn vertically and in FIG. 3b the lateral distance from the lane edge marking. Here too, the lateral distance from time TO exceeds the limiting value which indicates a departure or a threatening departure from the track. As above, the steering angle curve, as sketched above, is characterized in that first very slight steering motions take place and then, in temporal connection with the departure from the track directly after time TO, a sudden large steering correction takes place. Consequently, even a momentary drowsiness is able to be detected by evaluating the steering angle signal, as shown above, or a combined evaluation of the steering angle signal and the lateral distance from the lane edge marking, as shown above.

Figure 4:
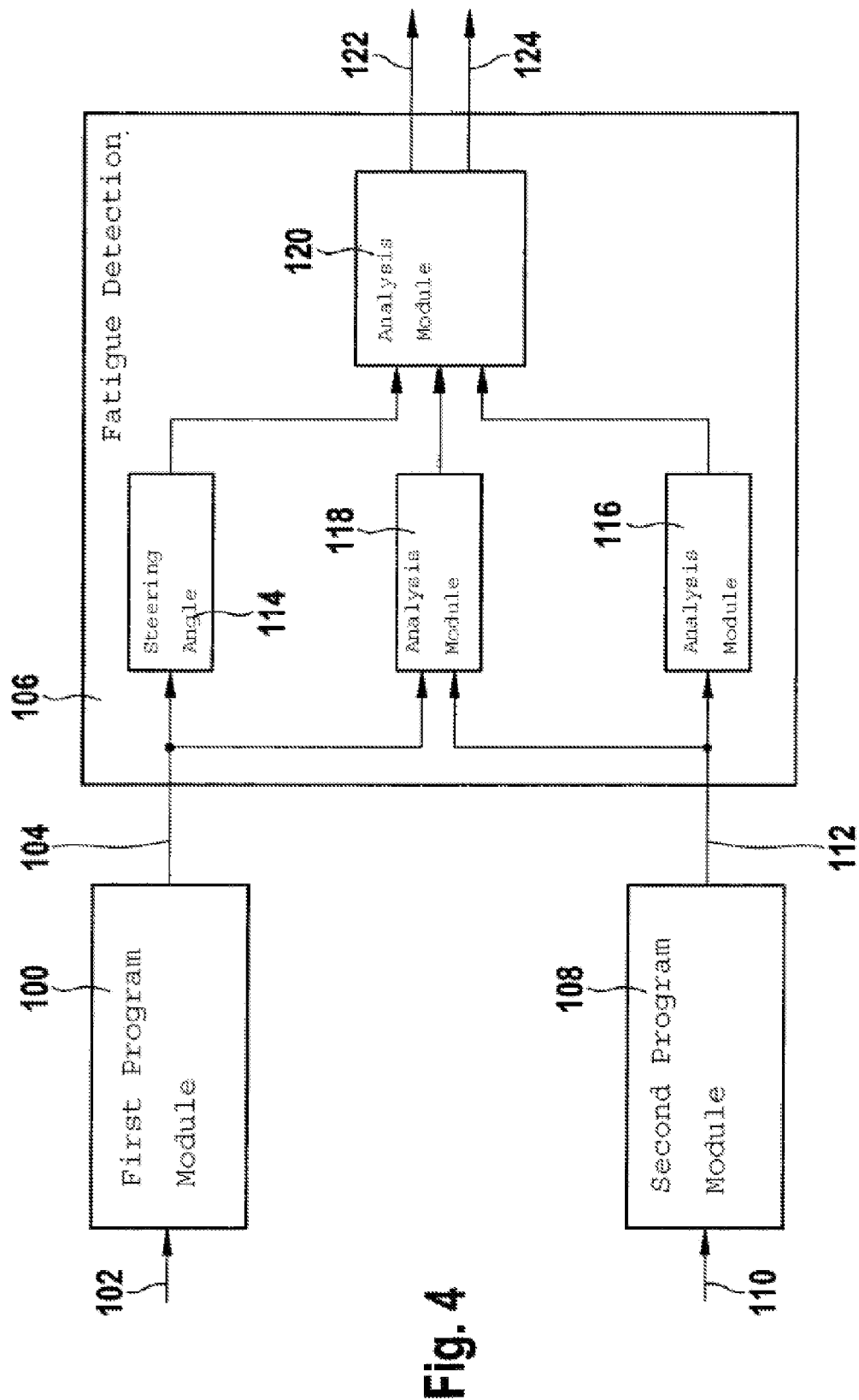
FIG. 4 shows a flow chart which sketches the method for driver state detection in the implementation as a computer.

FIG. 4 shows a flow chart of the implementation of the procedure shown, on the example of a computer program. The blocks shown there are program modules, their arrangement as well as the connecting arrows demonstrating the sequence of the processing of the program modules in the computer, and the information flow.

In first program module 100, the steering angle value read in via feed line 102 is evaluated. In one exemplary embodiment, a steering angle modification is derived from the steering angle values that were read in, for instance, by differentiating the steering angle signal with respect to time. The steering angle modification derived thereby is compared to specified limiting values. The evaluation is performed, in this instance, in such a way that the exceeding of a limiting value is recognized as being relevant if the exceeding of the limiting value was detected after the expiration of a predetermined time duration having only slight steering angle modifications.

In one embodiment, the frequency of the detection of such a situation is employed. This is done, for instance, by decrementing a counter at predetermined intervals, and incremented with each detected steering correction situation, so that, using the counter, the frequency of steering angle corrections may be stated. If this steering correction frequency (counter state) exceeds a predetermined value, a signal is generated which represents the detection of frequent sudden steering corrections. Moreover or alternatively, when a predefined amplitude value of the steering correction is exceeded within the scope of the situation shown above, a corresponding signal is output. The signal(s) named is/are then routed via connection 104 to the module "fatigue detection" 106.

A further program module 108 represents a track-based driver assistance system, for example, a lane departure warning. This module ascertains, for instance, via images of the surroundings of the vehicle supplied by connection 110, the course of the track and the position of one's own vehicle in it, especially the lateral distance of the vehicle from the lane edge marking. Depending on the embodiment, module 108 detects the situation of the lane departure or the threatening lane departure by comparison of the lateral distance to predefined limiting values, and determines this single event, and/or, analogously to the representation above, with respect to the steering angle, the frequency of the lane departures or the threatening lane departures. In another embodiment, for example, the standard deviation of the lateral distance is ascertained, and from it a measure is derived for the lane behavior of the driver, for instance, good/bad. One or more of these data are then supplied to module fatigue detection 106 via connection 112.

The module fatigue detection is made up essentially of modules 114 (analysis of the results of steering angle module 100), 116 (analysis of the results of module 108) and 118 (overall analysis of both results). The data of module 100 are supplied to module 114 and module 118, and the data of module 108 are supplied to module 116 and 118. In module 114 it is checked whether the frequencies of steering corrections ascertained or the steering correction undertaken has reached a degree that permits one to conclude that there is an inattentive driver. This is the case when, for example, the frequency of the steering corrections exceeds specified limiting values, a steering pattern has occurred which corresponds to a sudden steering correction, etc. This information is supplied to a module 120, in which the various analyses are valued and weighted, and on this basis an output signal is generated concerning the driver's state.

Module 116 works corresponding to module 114, the data ascertained from module 108 being evaluated with respect to the lane behavior of the driver. If the lane behavior, or the frequency or severity of the lane departures induce one to assume inattention of the driver, module 116 transmits this information to module 120. Module 116 ascertains possible inattention from a high frequency of lane departures, from bad lane behavior, etc.

Module 118 evaluates both types of information. A typical example is that one assumes inattention of the driver if approximately at the same time a lane departure occurs, a steering pattern occurs which corresponds to a sudden steering intervention (see the above representation). If this is the case, module 118 will emit information to module 120, in which inattention of the driver is assumed.

Module 120 values and weights the various results of the analysis. If, for example, an inattention information of module 118 is present which, as a rule, is valued very highly, the driver is informed via output 122 and/or via output 124 driver assistance systems or driver information systems are adjusted.

In a corresponding manner, in response to driver fatigue, an output signal is generated based on the lane data because of the analysis of module 114 and in response to a driver inattention detection that is time-wise not so far in the past. In one specific embodiment, it is decided, solely on the basis of the steering angle signal, whether there is an inattentive driver or not.

Signals are transported via lines 104 and 112 which are evaluated individually in modules 114 and 116 (see above extraction of features). Module 118 makes possible the extraction of overall features from both "raw signals". For instance, one would lose the information on possible zigzag driving by the vehicle's driver if only the feature "lane departure" were extracted in module 116. Therefore, module 118 evaluates the raw signals, steering angle and lane position, in common, and is thus able to detect deliberate zigzag driving, for example. This is not possible if the raw signals are evaluated individually.

In one embodiment, modules 114, 118 and 116 supply processed features, using which a good result may be achieved on the matter of fatigue detection, even when each is taken individually. The availability of all these features, however, also makes possible a common evaluation using weighting of the individual features, so as, among other things, to test the plausibility of individual features and to make the overall evaluation more robust. This evaluation may be made, for instance, based on linear or nonlinear models, with the aid of fixed or adjustable boundary values. Another possibility is the valuing of the overall features in the fuzzy domain, or in the evaluation by a neuronal network. For both of the last-named possibilities, it is meaningful to train the system to the individual driver. To do this, it is conceivable to begin the system first using standard models (linear or nonlinear), and, over a longer period, to train in parallel the fuzzy or neuronal network evaluation. Module 120 obtains feedback concerning the evaluation of the features via the modified driving behavior, based on the prior outputs via 122 and 124 (it improves the results of the training).

What is claimed is:

1. A method for detecting a state of a driver, the method comprising:
   recording a curve over time of a signal of at least one vehicle characteristic;
   determining whether the recorded curve meets at least one predetermined criterion; and
   responsive to determining in the determining step that the at least one predetermined criterion is met by the recorded curve, generating a signal which shows the driver state as being inattentive;
   wherein the inattentive driver state is determined, and the generation of the signal showing the inattentive state is performed, responsive to detecting in the determining step at least one of:
   a sudden increase of a steering angle change after a phase of slight change;
   a temporal correspondence between driver performance of a steering correction and at least one of an actual lane departure and a threatened lane departure; and
   occurrence of driver performance of a steering correction at a predetermined frequency, each of the steering corrections including a sudden increase in at least one of steering angle and steering angle change.

2. The method of claim 1, wherein the inattentive driver state is determined and the signal generation is performed responsive to the detection of the sudden increase of the steering angle change after the phase of slight change.

3. The method of claim 2, wherein the inattentive driver state is determined and the signal generation is performed responsive to the detection of the occurrence of the driver performance of the steering correction at the predetermined frequency.

4. The method of claim 1, wherein the inattentive driver state is determined and the signal generation is performed responsive to the detection of the driver performance of the steering correction being in response to the at least one of the actual lane departure and the threatened threatening lane departure.

5. The method of claim 1, wherein the inattentive driver state is determined and the signal generation is performed responsive to the detected temporal correspondence of the steering correction and the at least one of the actual lane departure and the threatened lane departure.

6. The method of claim 1, wherein, for the driver state detection, a steering behavior and a track behavior are in each case evaluated individually and in common, and the results are considered in a driver state detection weighted differently.

7. The method of claim 1, wherein the inattentive driver state is determined, and the generation of the signal showing the inattentive state is performed, responsive to detecting in the determining step a sudden increase of a steering angle after a phase of slight change.

8. A device for detecting a state of a driver, comprising:
   a computer unit configured to:
   evaluate whether a recorded curve over time of a signal of at least one vehicle characteristic meets at least one predetermined criterion; and
   responsive to the evaluation being that the at least one predetermined criterion is met by the recorded curve, generate a signal identifying the driver state as being inattentive;

wherein the inattentive driver state is determined, and the generation of the signal showing the inattentive state is performed, responsive to the evaluation including detection of at least one of:
- a sudden increase of a steering angle change after a phase of slight change;
- a temporal correspondence between driver performance of a steering correction and at least one of an actual lane departure and a threatened lane departure; and
- occurrence of driver performance of a steering correction at a predetermined frequency, each of the steering corrections including a sudden increase in at least one of steering angle and steering angle change.

9. A method for detecting a state of a driver, the method comprising:
- for each of at least two vehicle characteristics, obtaining a respective set of signals over time;
- determining, based on the signals, a correspondence between a change in each of the at least two vehicle characteristics to each other; and
- based on a determination in the determining step of a predetermined correspondence, generating a signal representing the state of the driver as being inattentive.

10. The method of claim 9, wherein the predetermined correspondence is a temporal correspondence.

11. The method of claim 10, wherein the at least two vehicle characteristics includes a steering angle and a distance to a lane marking.

12. The method of claim 11, further comprising:
- determining that a driver steering correction has occurred by analyzing the signals corresponding to the steering angle; and
- detecting an exceedance of a limit value with respect to the distance, wherein the predetermined temporal correspondence is between a time at which the driver steering correction has occurred and a time at which the exceedance has occurred.

* * * * *

UNITED STATES PATENT AND TRADEMARK OFFICE
CERTIFICATE OF CORRECTION

PATENT NO. : 8,593,288 B2  Page 1 of 1
APPLICATION NO. : 12/085858
DATED : November 26, 2013
INVENTOR(S) : Schmitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1562 days.

Signed and Sealed this
Twenty-second Day of September, 2015

Michelle K. Lee
*Director of the United States Patent and Trademark Office*